(12) United States Patent
Breda

(10) Patent No.: US 7,967,027 B2
(45) Date of Patent: Jun. 28, 2011

(54) SIMPLE DIVERTER VALVE FOR A ROMAN TUB WITH REPLACEABLE CARTRIDGE INCLUDING AT LEAST TWO CHECKS

(76) Inventor: Silvano Breda, Downsview (CA)

( * ) Notice: Subject to any disclaimer, the term of this patent is extended or adjusted under 35 U.S.C. 154(b) by 1212 days.

(21) Appl. No.: 11/284,964

(22) Filed: Nov. 23, 2005

(65) Prior Publication Data

US 2006/0108010 A1   May 25, 2006

(30) Foreign Application Priority Data

Nov. 24, 2004  (CA) .................................... 2488455

(51) Int. Cl.
*E03C 1/02* (2006.01)
*F16K 15/02* (2006.01)
(52) U.S. Cl. ........... 137/614.2; 137/625.11; 137/625.46; 137/512
(58) Field of Classification Search .................. 137/512, 137/625.11, 454.2, 614.2, 625.46, 625.47
See application file for complete search history.

(56) References Cited

U.S. PATENT DOCUMENTS

| | | | | |
|---|---|---|---|---|
| 2,834,376 | A | * | 5/1958 | Hughes ..................... 137/625.11 |
| 3,236,260 | A | * | 2/1966 | Halsey ........................ 137/614.2 |
| 3,524,470 | A | * | 8/1970 | Kah, Jr. et al. ............. 137/624.18 |
| 4,109,670 | A | * | 8/1978 | Slagel ....................... 137/625.11 |
| 4,492,247 | A | * | 1/1985 | Lockwood ................ 137/119.03 |
| 4,614,113 | A | * | 9/1986 | Daghe et al. ................ 137/454.2 |
| 5,148,828 | A | * | 9/1992 | Farnham ......................... 137/512 |
| 5,425,394 | A | | 6/1995 | Clare |
| 5,685,330 | A | * | 11/1997 | Breda ............................ 137/218 |
| 5,901,735 | A | * | 5/1999 | Breda ............................ 137/218 |
| 5,970,534 | A | * | 10/1999 | Breda ............................ 4/541.1 |
| 6,196,266 | B1 | * | 3/2001 | Breda ....................... 137/625.11 |
| 6,478,047 | B1 | * | 11/2002 | Powell ........................... 137/512 |
| 6,581,626 | B2 | * | 6/2003 | Noll et al. ...................... 137/512 |
| 6,913,033 | B2 | * | 7/2005 | Breda ............................ 137/218 |
| 2004/0194822 | A1 | * | 10/2004 | Breda ............................ 137/218 |

\* cited by examiner

*Primary Examiner* — John Rivell
(74) *Attorney, Agent, or Firm* — Neil H. Hughes; Ivor M. Hughes; Marcelo K. Sarkis

(57) ABSTRACT

A diverter valve includes a housing and a diverting stem cartridge. The housing has a top and a bottom and a stem cartridge receiving chamber. The housing also has an inlet port proximate the bottom thereof and a plurality of laterally directed outlet ports. Each outlet port directs water to selective alternative uses such as a spout, shower, body spray or the like. The stem cartridge also has an inlet port proximate the bottom and has a plurality of laterally directed outlet ports for selective alignment with the outlet ports of the housing. The inlet ports and outlet ports of said stem cartridge has therebetween a stem waterway to allow water to flow from the inlet to said outlets. The cartridge has contained therein at least two checking mechanisms disposed prior to the waterway. The at least two check mechanisms prevents water from the outlet ports from contaminating the water supply. Replacement of the stem cartridge permits simple replacement of faulty checking devices without the need for skilled tradesmen being involved.

7 Claims, 22 Drawing Sheets

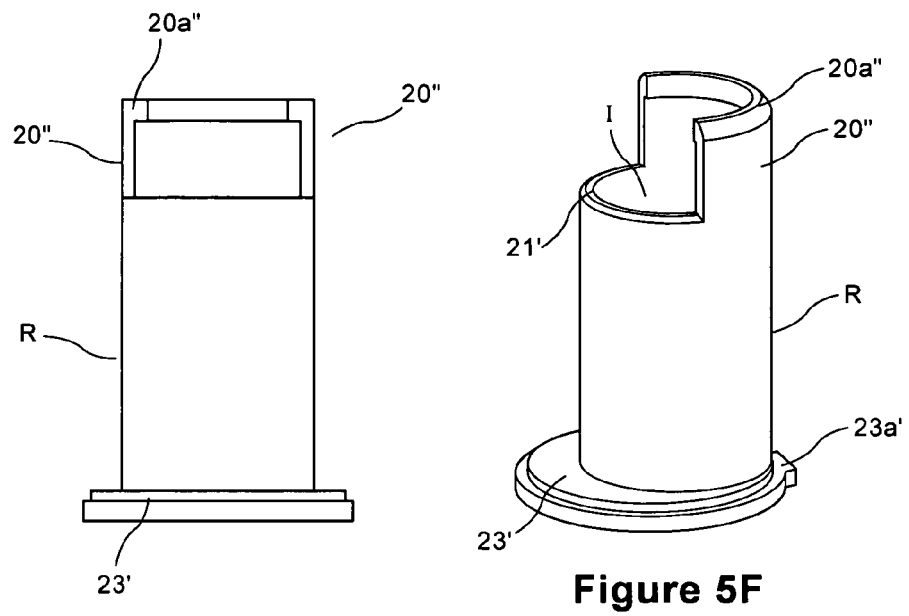
Figure 5G
Figure 5F
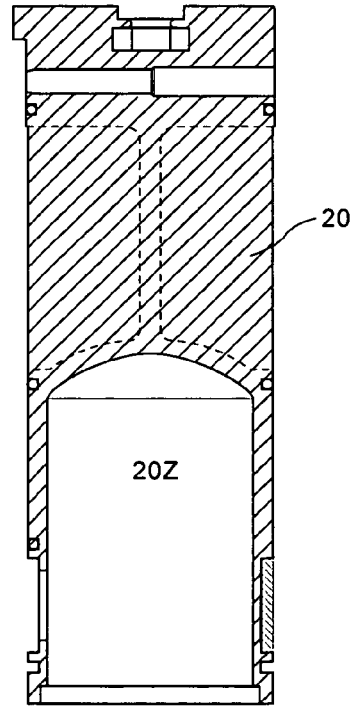
Figure 5E

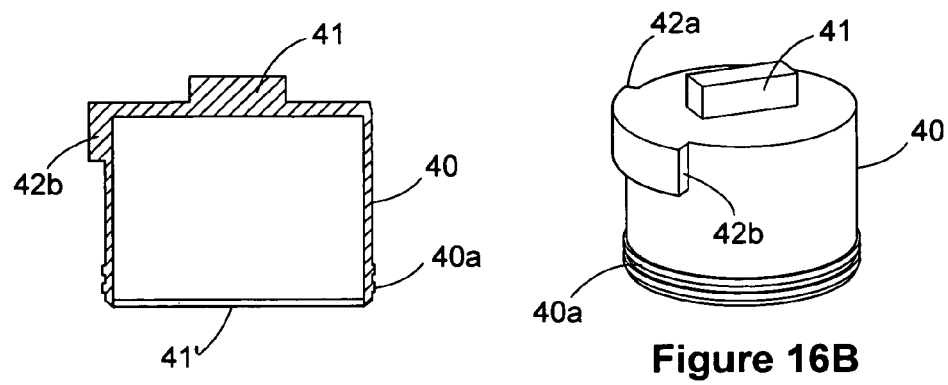
Figure 16A
Figure 16B
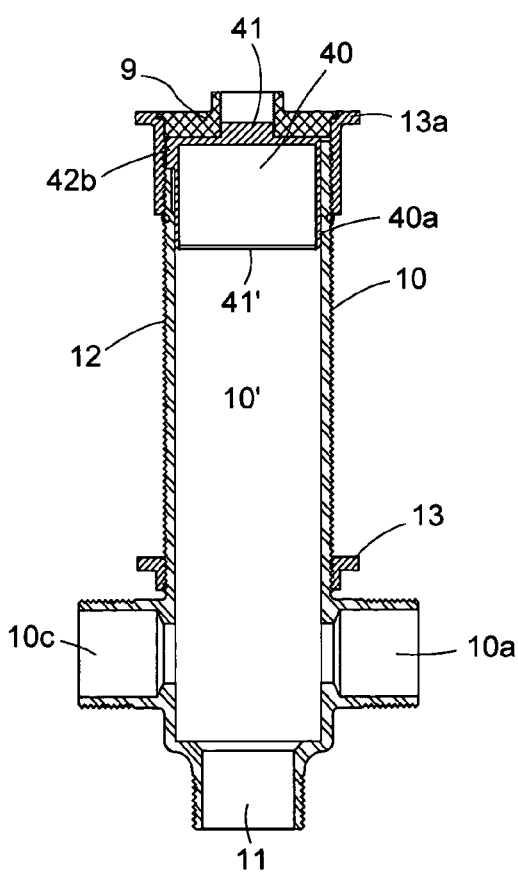
Figure 16C

SIMPLE DIVERTER VALVE FOR A ROMAN TUB WITH REPLACEABLE CARTRIDGE INCLUDING AT LEAST TWO CHECKS

FIELD OF THE INVENTION

This invention relates to diverting valves and the simplification thereof.

BACKGROUND OF THE INVENTION

Checking devices can be strategically located in the supply line of the water system, preventing the flow of water from any one of a number of selected outlets back to the inlet water supply. In a bath tub the water may be diverted to the spout, showerhead or removable handheld shower, and so on. Such checking devices are used in commercial and household installations, for example Roman Tubs to prevent the contamination of the potable water supply. Alternatively checks have been provided in the wands of handheld devices which may not function if the wand is removed or replaced.

Applicant therefore provides herein a valve assembly comprising a dual check in a given circuit as required by code but disposed within a compact, easily manufactured, replaceable cartridge which much simplifies meeting the code requirement for two separate check installations in the feed-lines which is more costly to install.

It is therefore an object of this invention, to provide a simplified diverter valve with a dual check which is entirely reliable and easily serviced.

It is a further object of the invention to provide a 3 way diverting valve with back flow prevention.

It is yet a further object of the invention to provide such a valve in easily replaceable cartridge format for the diverting valve and for the back flow prevention.

Further and other objects of the invention will become apparent to those skilled in the art from the following summary of the invention and more detailed description of preferred embodiments illustrated herein.

SUMMARY OF THE INVENTION

According to a primary aspect of the invention there is provided a valve assembly comprising a body containing an opening therein, said opening for receiving a valve cartridge, said body comprising an inlet and at least one outlet, said cartridge comprising an inlet and at least one outlet having a waterway disposed there between, said cartridge being operable to selectively permit water flow to said outlet of said body from an outlet of said cartridge, the inlet of said cartridge including two check valve assemblies in series (preferably also in a replaceable cartridge form) which allow for water to flow from the inlet toward at least one outlet of the cartridge but which does not permit the water to return from the waterway through each check valve into the waterway to the inlet, wherein water from the outlets cannot re-enter the water supply to the valve to contaminate said water supply.

According to another aspect of the invention there is provided a diverter valve comprising a housing and a diverting stem cartridge, said housing having a top and a bottom and a stem cartridge receiving chamber extending from proximate the top to proximate the bottom of said housing, said housing having an inlet port proximate the bottom thereof and a plurality of laterally directed outlet ports extending from the cartridge receiving chamber, each outlet port for directing water for selective alternative uses such as a spout, shower, body spray or the like, said stem cartridge having an inlet port proximate the bottom thereof in alignment with the inlet of said housing and having a plurality of laterally directed outlet ports for selective alignment with the outlet ports of said housing, said inlet ports and outlet ports of said stem cartridge having disposed there-between a stem waterway to allow water to flow from the inlet to said outlets, said cartridge having an interior defining said waterway and having contained therein adjacent said stem cartridge inlet port at least two checking mechanisms (preferably also in a replaceable cartridge form) disposed prior to said waterway, said at least two check mechanisms preventing water from the outlet ports from contaminating the water supply, wherein replacement of said stem cartridge (or alternatively replacement of check cartridge) permits simple replacement of faulty checking devices without the need for skilled tradesmen being involved.

According to yet another aspect of the invention there is provided a diverting valve assembly for a roman tub or the like comprising a body containing an opening therein, said opening for receiving a diverting cartridge, said body comprising an inlet and at least one outlet, said cartridge comprising an inlet and at least one outlet having a waterway disposed there between, said cartridge being rotatable within a predetermined range to selectively align said outlet of said body with an outlet of said cartridge, the inlet of said cartridge including two check valve assemblies in series (preferably disposed with a check cartridge) which allow for water to flow from the inlet toward at least one outlet of the cartridge but which does not permit the water to return from the waterway through each check valve into the waterway to the inlet, wherein water from anyone of a selected number of outlets cannot re-enter the water supply to the valve to contaminate said water supply.

According to yet another aspect of the invention there is provided a valve assembly comprising a body containing an opening therein, said opening for receiving a valve cartridge, said body comprising an inlet and at least one outlet, said cartridge comprising an inlet and at least one outlet having a waterway disposed there between, said cartridge being operable to selectively permit water flow to said outlet of said body from an outlet of said cartridge, the inlet of said cartridge including two check valve assemblies in series in a replaceable check cartridge form which allows for water to flow from the inlet toward at least one outlet of the cartridge but which does not permit the water to return from the waterway through each check valve into the waterway to the inlet, wherein water from the outlets cannot re-enter the water supply to the valve to contaminate said water supply, and wherein the check cartridge may be replaced without the necessity of replacing the entire cartridge.

In one embodiment of the invention described in the previous paragraphs the diverter valve housing may include a cut out portion proximate the top thereof extending about a predetermined extent of the housing for co-operation with a stop portion provided with the cartridge to limit the rotation of the cartridge between selected positions. In yet another embodiment of the invention described in the previous paragraphs said housing may include a threaded portion proximate the top thereof adjacent the opening thereof for receiving a corresponding threaded rotatable plug for retaining the cartridge in place within said housing. Preferably said threaded rotatable plug has an opening to receive a spindle portion surrounded by a cylindrical sleeve threaded on the exterior thereof to allow attachment of appropriate trim portions adjacent a handle. Preferably said housing includes a detent and said cartridge includes a mating tab to ensure correct alignment of all functions of said valve.

BRIEF DESCRIPTION OF THE DRAWINGS

The invention will now be illustrated with reference to drawings of embodiments of the invention.

FIGS. 16A and 16B refer to a side and perspective views of the flush plug and illustrated in preferred embodiment of the invention.

FIG. 16C refers to the valve body (10) having the flush plug installed therein for the purpose which will hereinafter be described.

DETAILED DESCRIPTION OF THE EMBODIMENTS OF THE INVENTION

Figure 1:
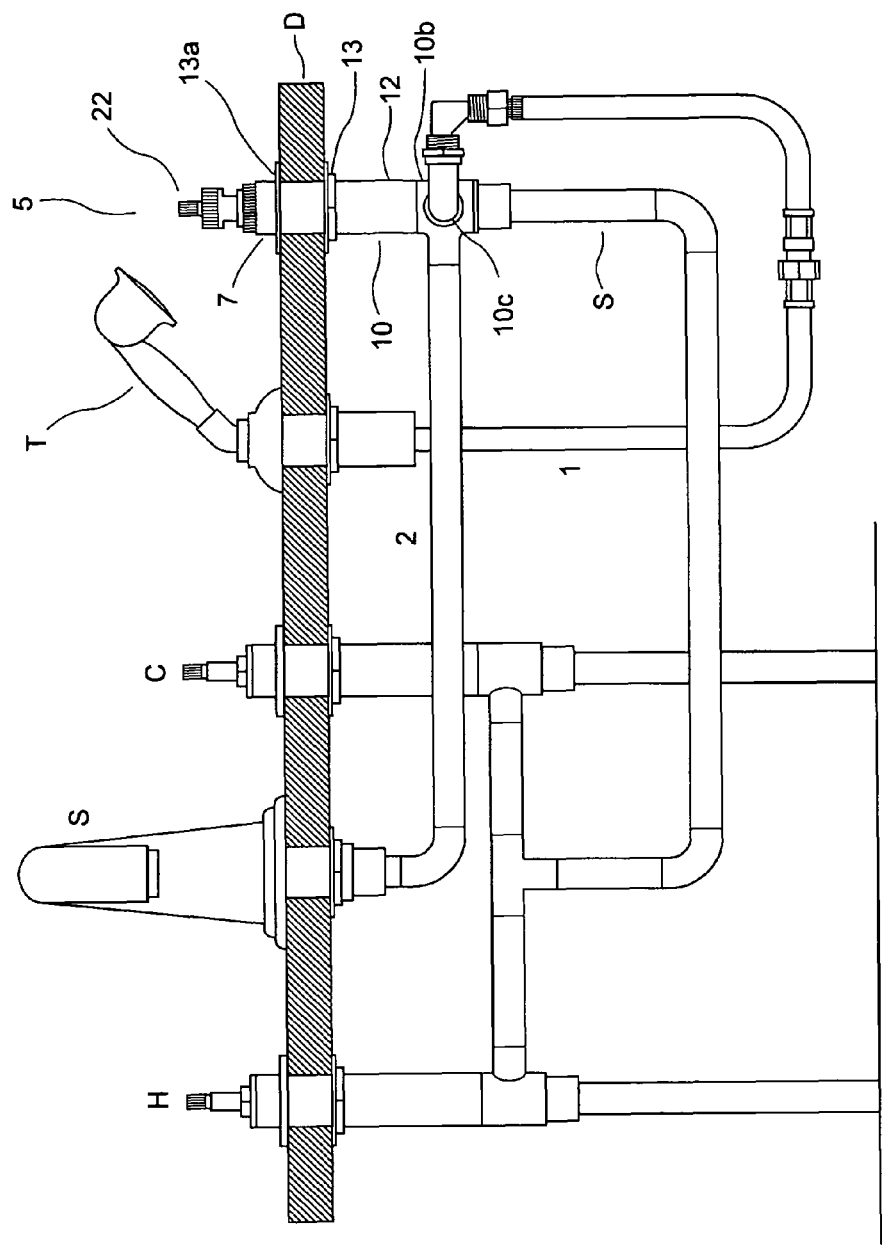
FIG. 1 is a schematic view of the diverter valve installed on a deck for a roman tub and illustrated in a preferred embodiment of the invention.
Figure 2:
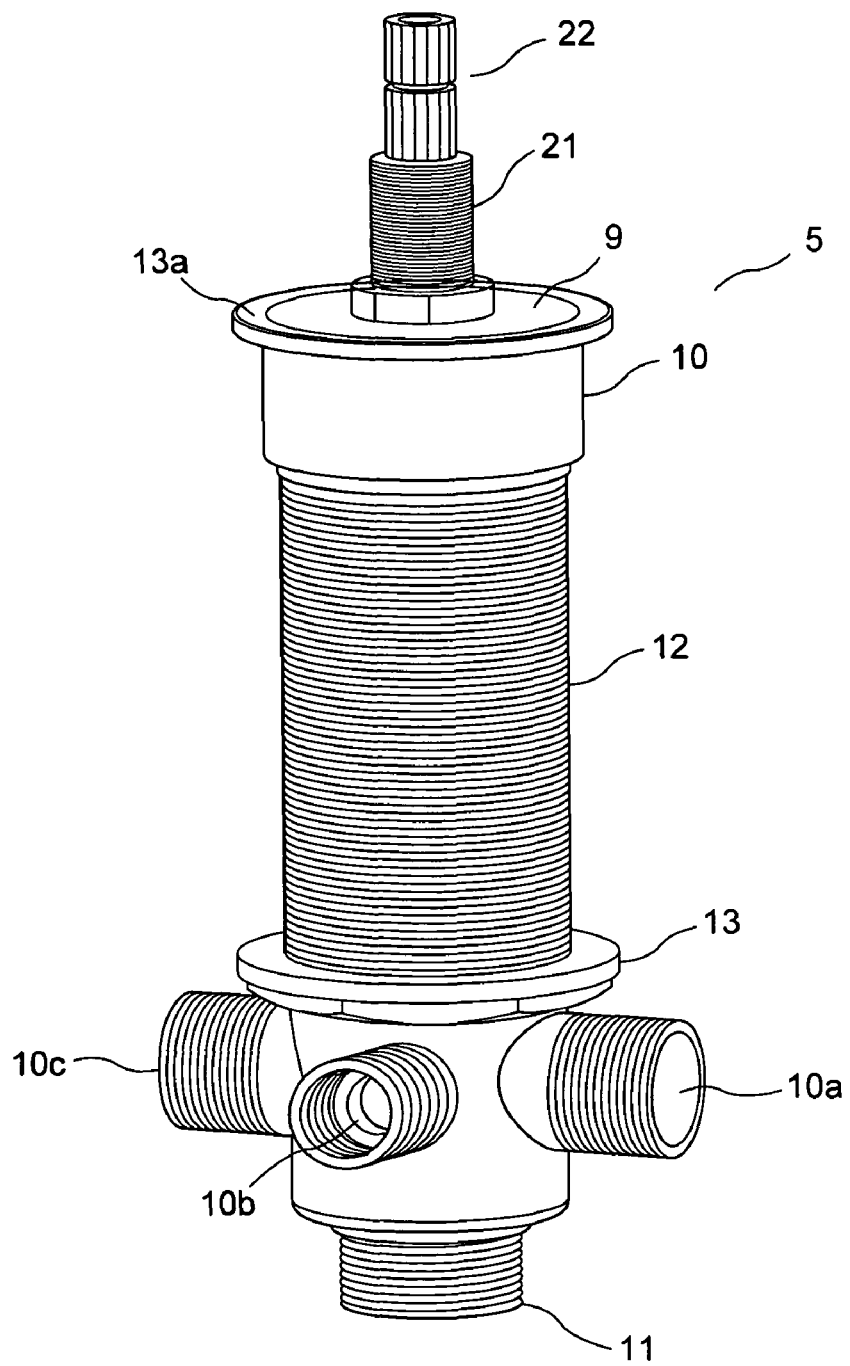
FIG. 2 is a perspective view of the diverter valve assembled and illustrated in isolation from the schematic view of FIG. 1.

Referring to FIGS. 1 and 2 there is illustrated the diverter valve (5) installed on a deck (D) of a roman tub installation having a predetermined thickness and openings there through, through which the diverting valve body (10) is inserted to assume the position as shown in FIG. 1. A mounting nut (13) is therefore provided with the valve assembly which is movable from a position shown in FIG. 2 by rotating the nut with respect to the length of thread (12) provided with the body (10) so that the mounting nut (13) and the trim portion (13A) of the body (10) cooperate to fasten the valve (5) on the deck (D) of the roman tub assembly. Once the valve (5) is mounted on the deck (D) the other connections can be made to connect the water supply (S) to the inlet (11) of the valve body and the outlet of the valve body (10C) via the necessary fittings to allow water to move in a direction (1) to the telephone shower spray (T) also installed on the deck (D) in a conventional manner and which installation will not be described herein. Further conventional hot (H) and cold (C) water valves are installed to supply the diverting valve as shown. The outlet (10B) of the diverting valve (5) is also connected to a second use with water flowing in a direction (2) to the spout S. In this case the second use is the actual spout that fills the roman tub or whirlpool or alternatively may be a shower spray. Outlet (10A) may also extend to a third use which is not illustrated.

Figure 3:
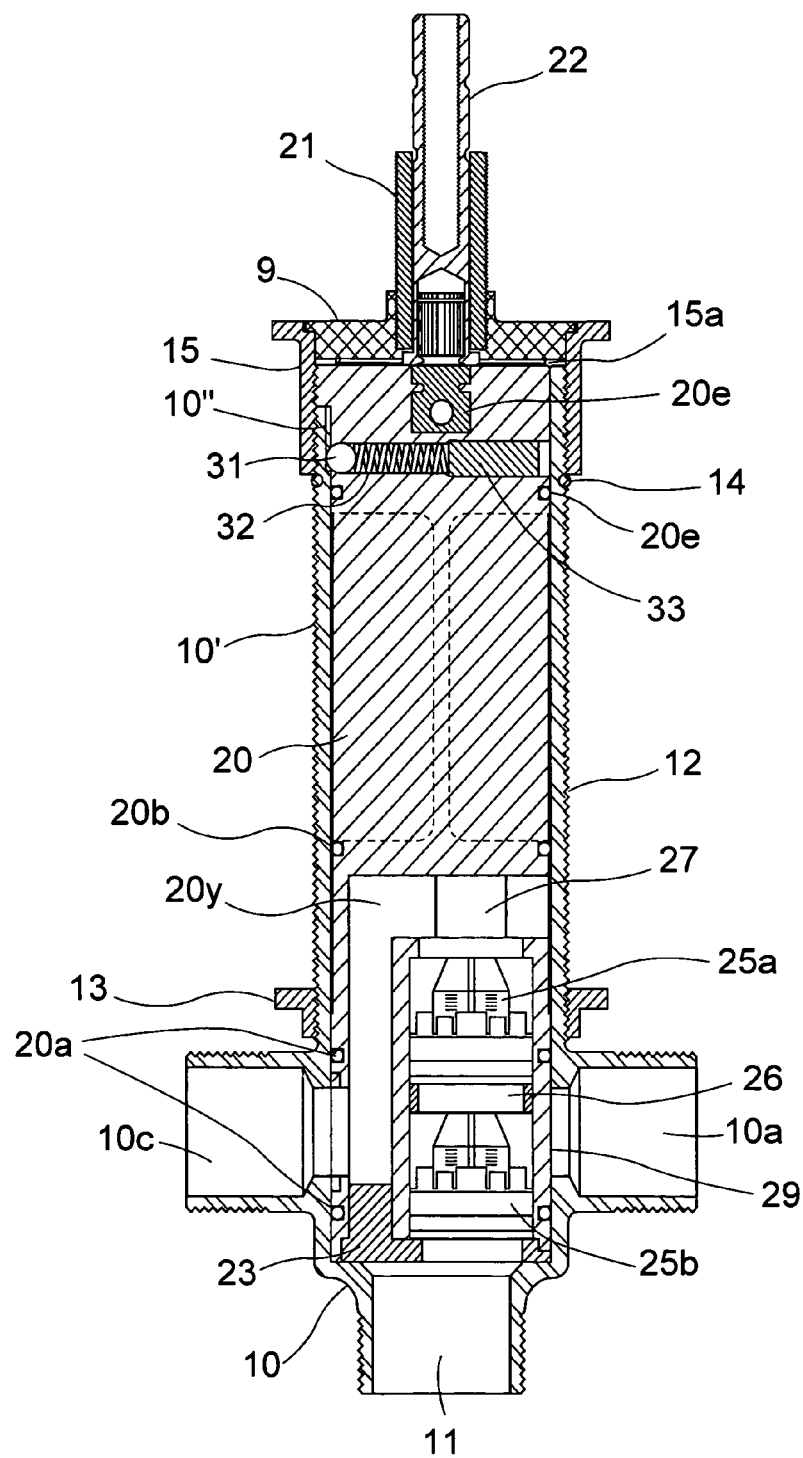
FIGS. 3 and 3A are cross-sectional views of the valve of FIG. 2 illustrating the interrelationship of the components therefore, illustrated in alternative embodiments of the invention.
Figure 3A:
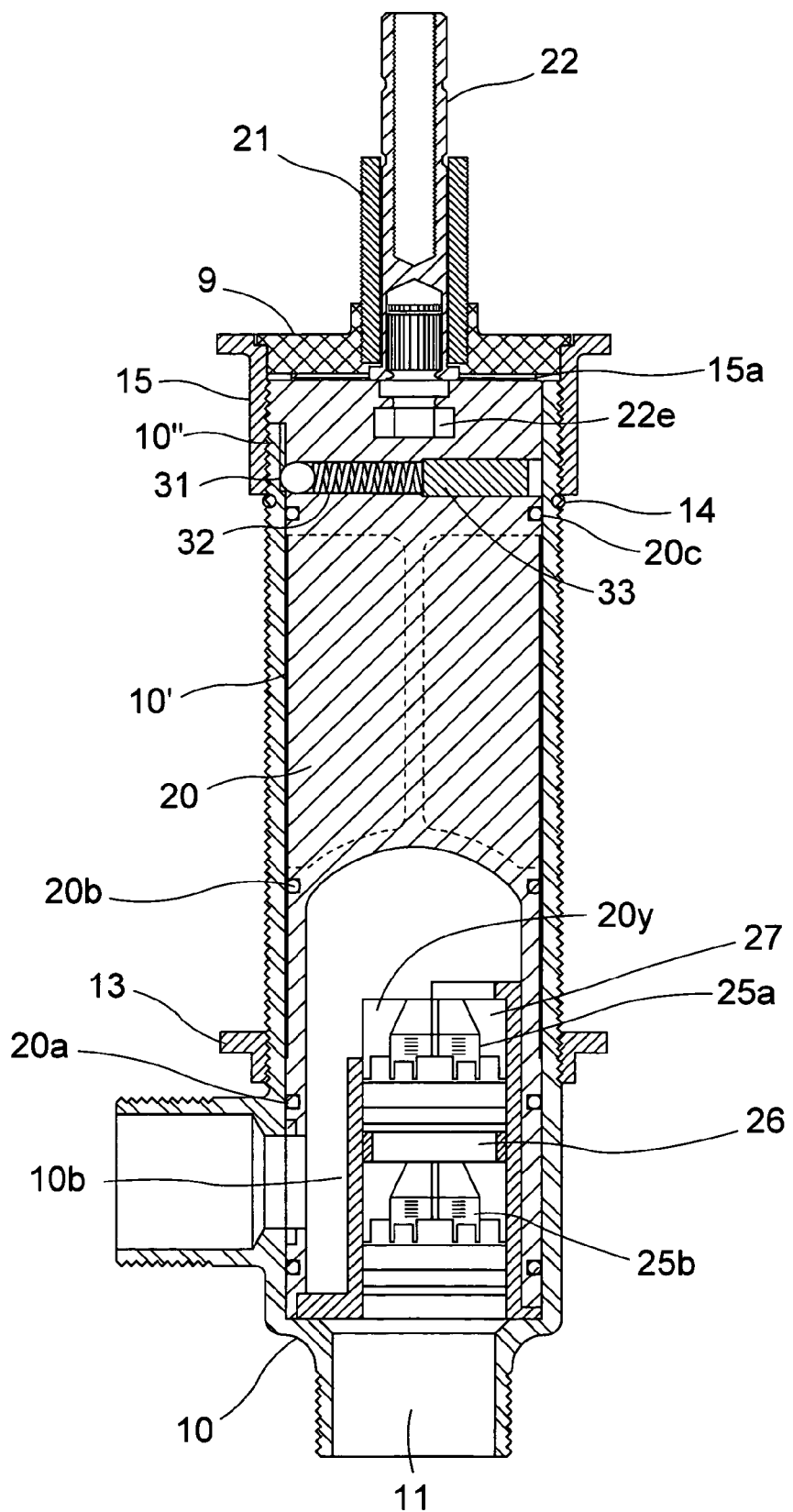
Figure 10:
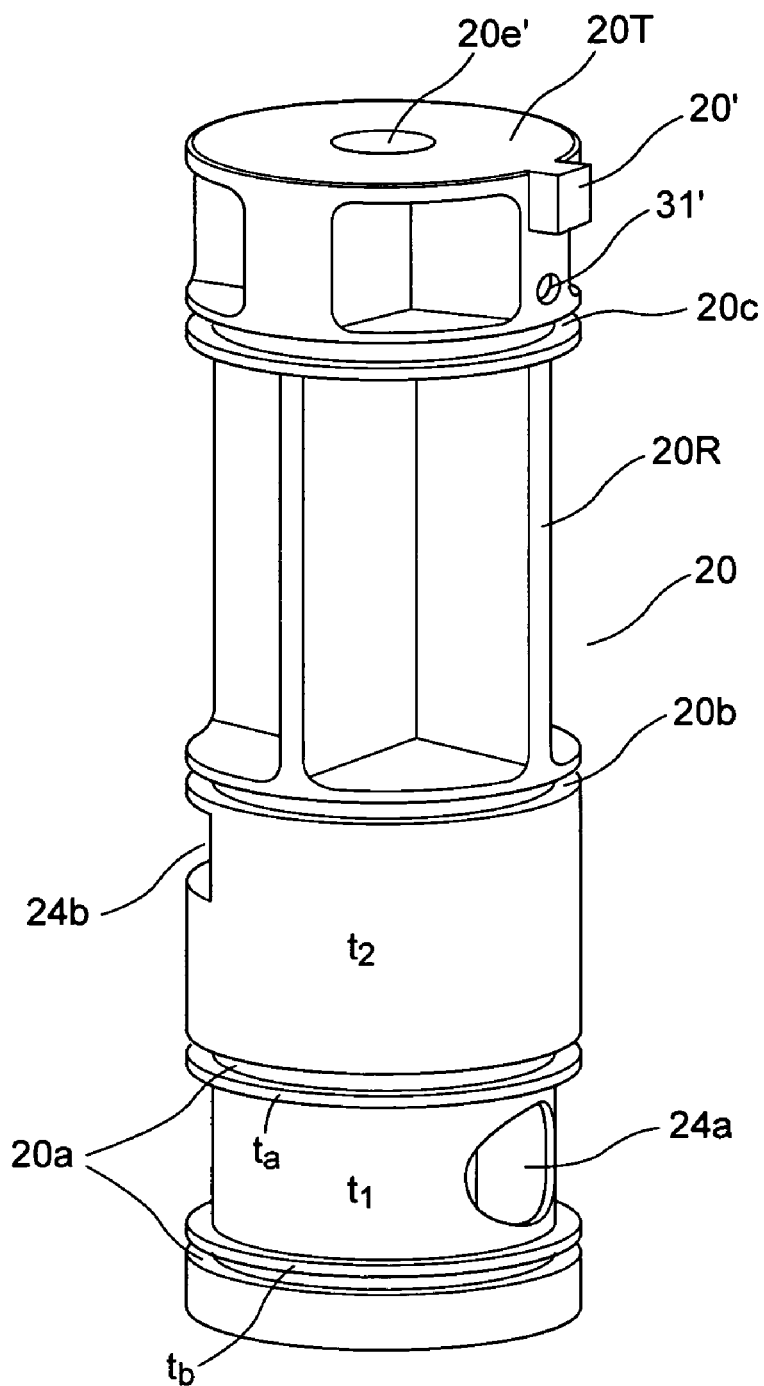
FIG. 10 is a perspective view of the diverting stem illustrated in one embodiment of the invention.

Referring now to FIGS. 3 and 3A there is illustrated the valve assembly (5) including the inlet (11) as best seen in FIG. 1 to receive the water supply from a supply source such as a typical hot (H) and cold (C) water valves or the like. The body (10) of the valve is made from brass and is contained in an opening (10') to receive the diverter stem (20) therein. The body opening (10') is closed by a trim nut portion (9) which extends around the stem sleeve portion (21) and seals the diverter stem (20) into the opening (10') of the valve body (10). The valve body (10) includes openings (10A, 10B and 10C) as best seen in FIG. 2 which may be coupled to various uses of the mixed water entering the valve through inlet (11). The diverter stem (20) may be selectively aligned to orient the water path of the diverter stem (20) as best seen in relation to FIG. 10 with the outlet (10A, 10B and 10C) of the valve body (10). The diverter stem therefore may only be aligned with any one of said valve body outlets (10A, 10B and 10C). The water outlets (24A and 24B) as best seen in FIG. 10 will therefore be selectively aligned with said body outlets by rotating the stem to selectively align 24A and 24B with the desired outlet (10A, 10B and 10C).

Figure 4:
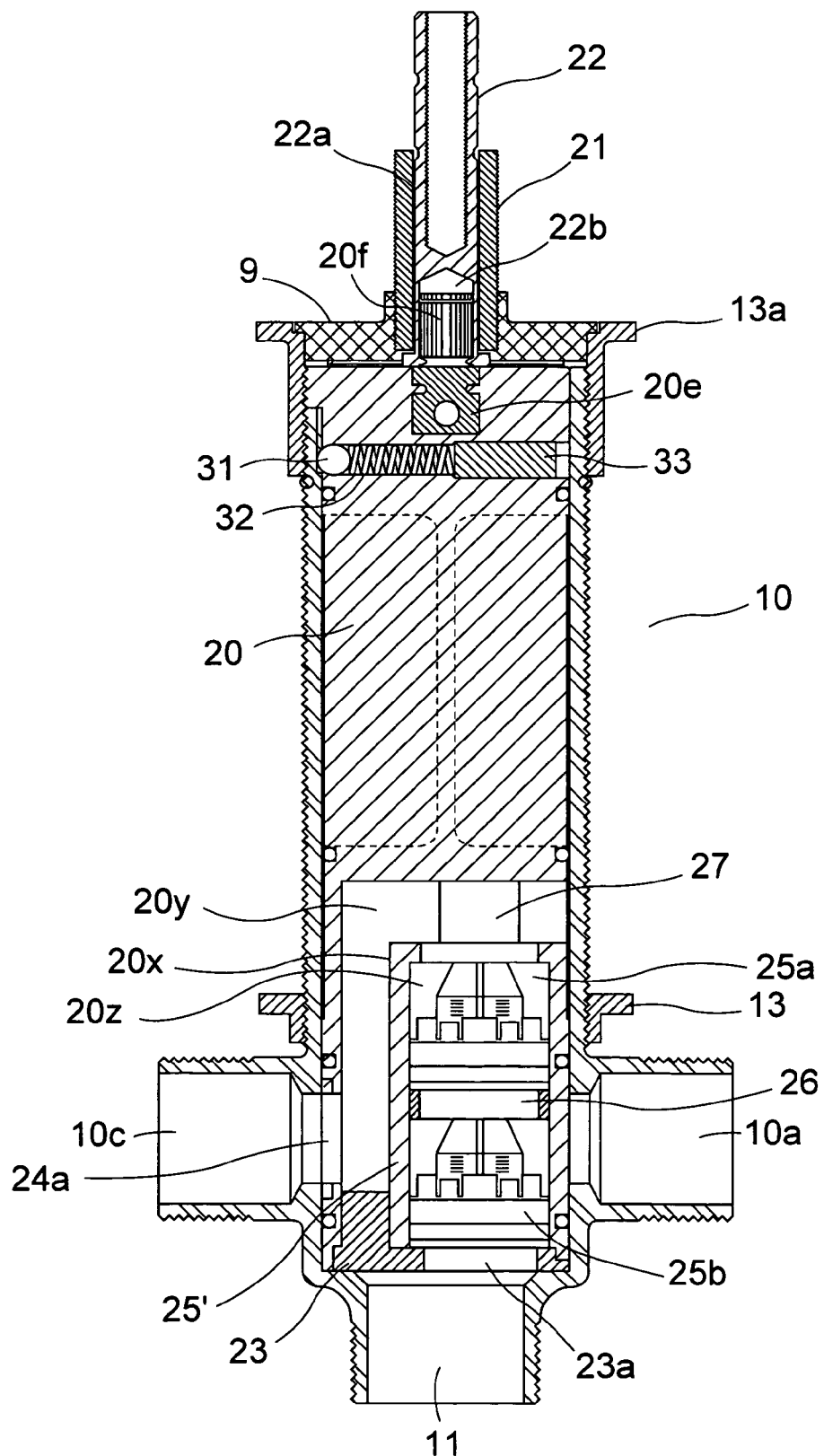
FIGS. 4 and 4A are similar views to that which is illustrated in FIGS. 3 and 3A.
Figure 4A:
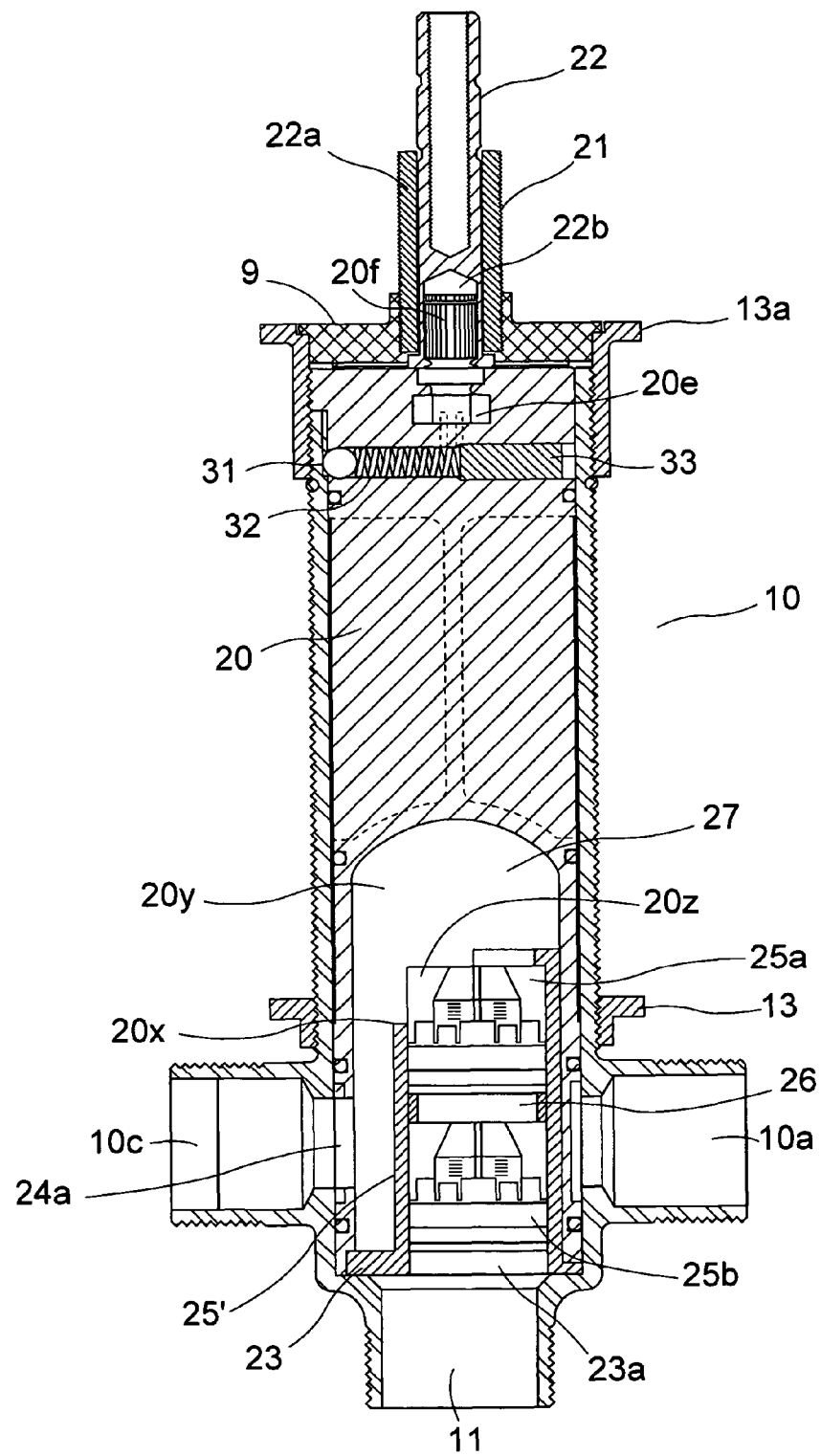
Figure 5:
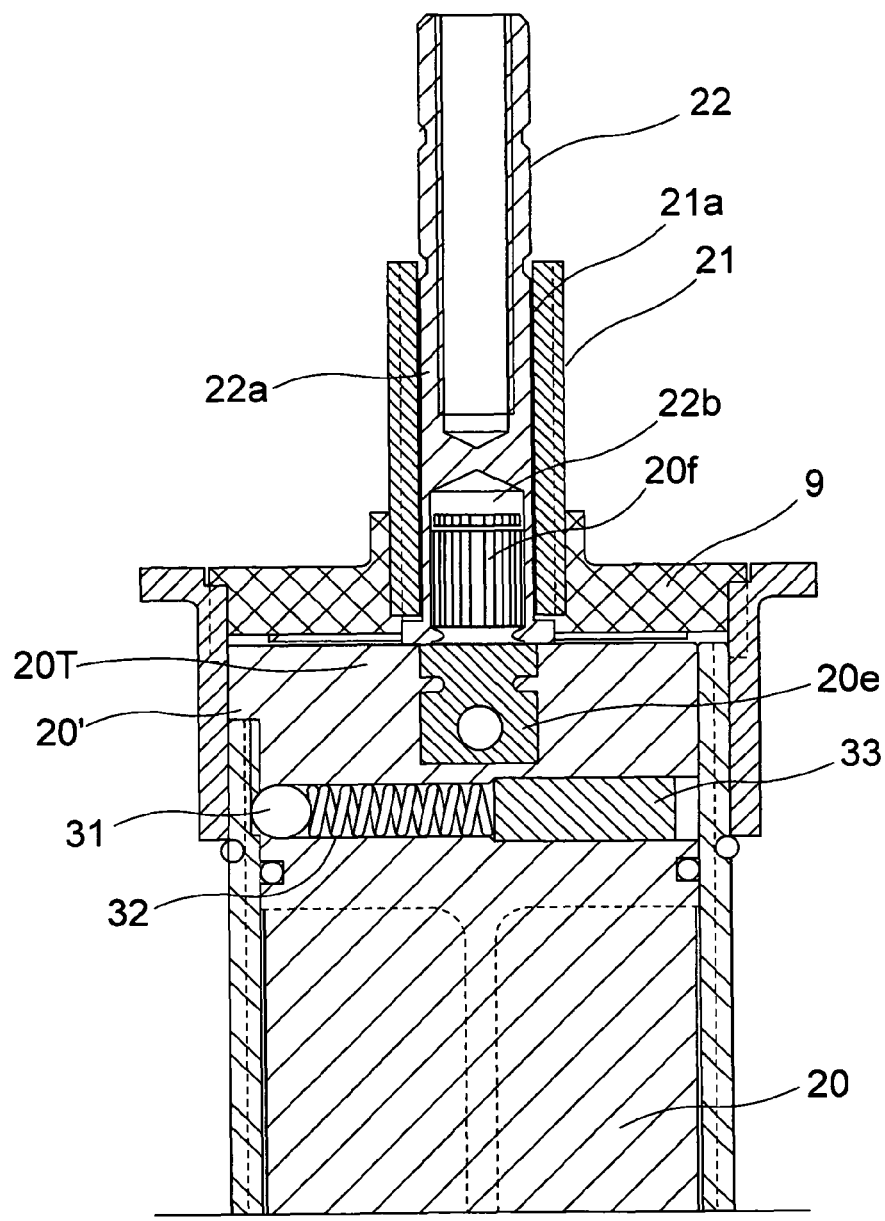
FIG. 5 is a close-up view of the top section of the valve shown in FIG. 4.
Figure 5A:
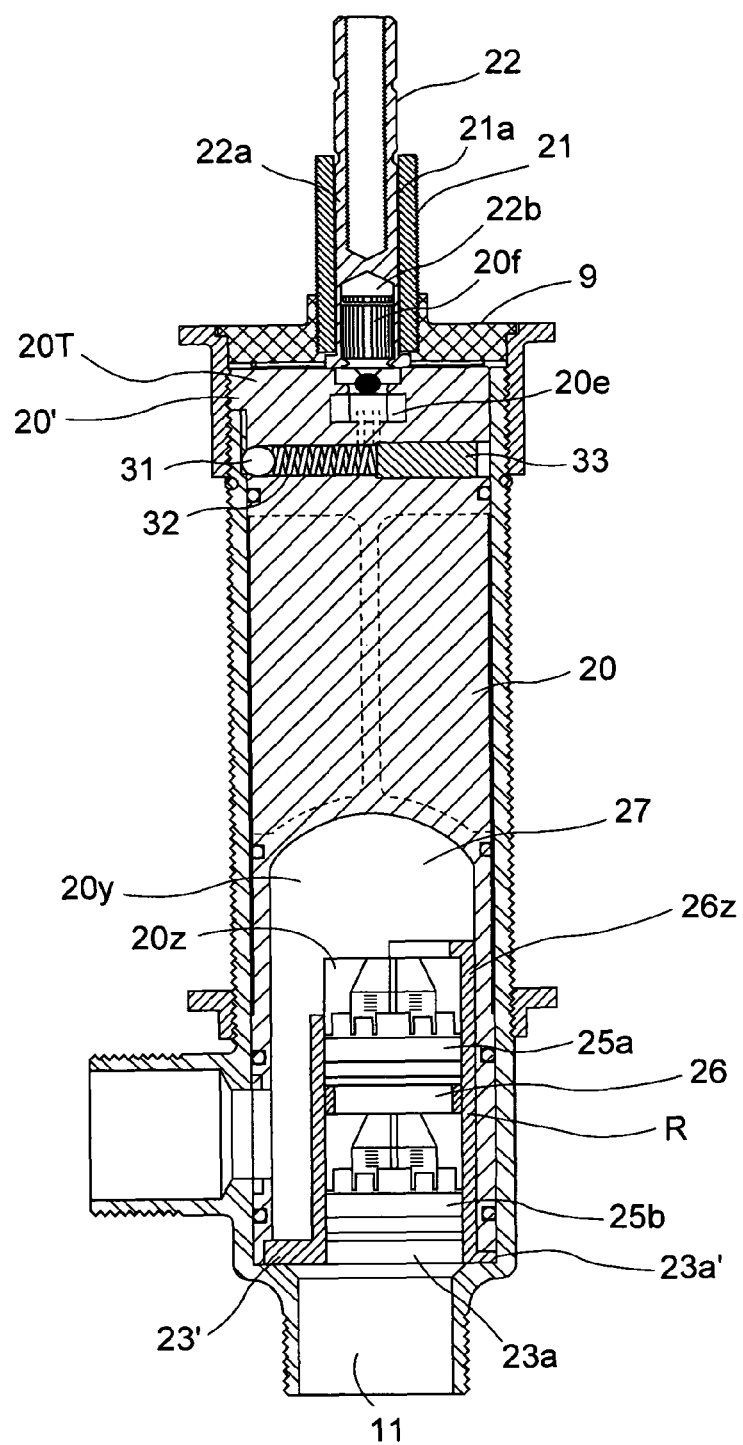
FIGS. 5A, B, C, D, E, F, and G include various views in cross section and perspective illustrating the co-operation of the replaceable check cartridge and the diverting cartridge illustrated in one embodiment of the invention.
Figures 5C, 5D:
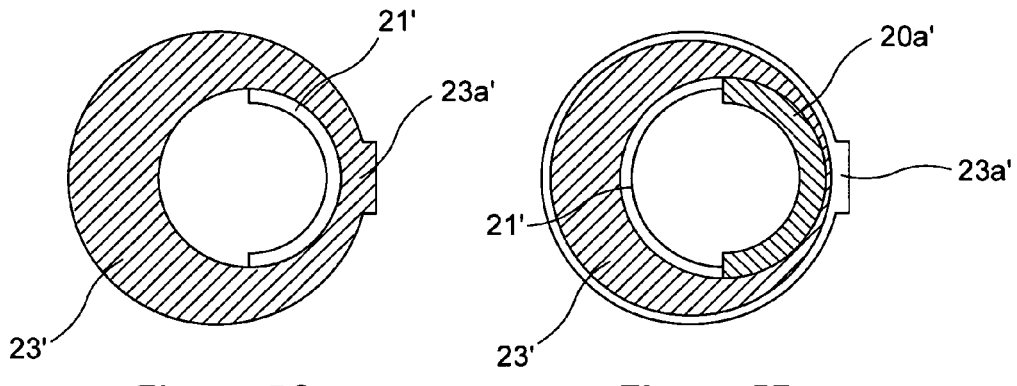
Figure 5B:
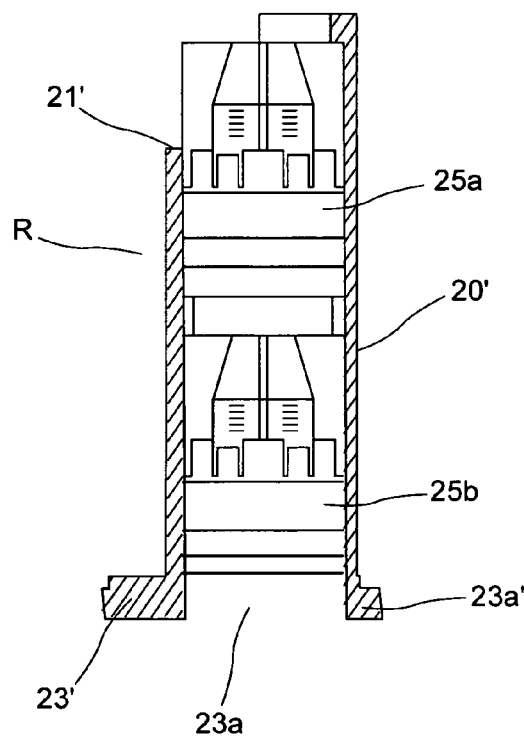
Figure 6:
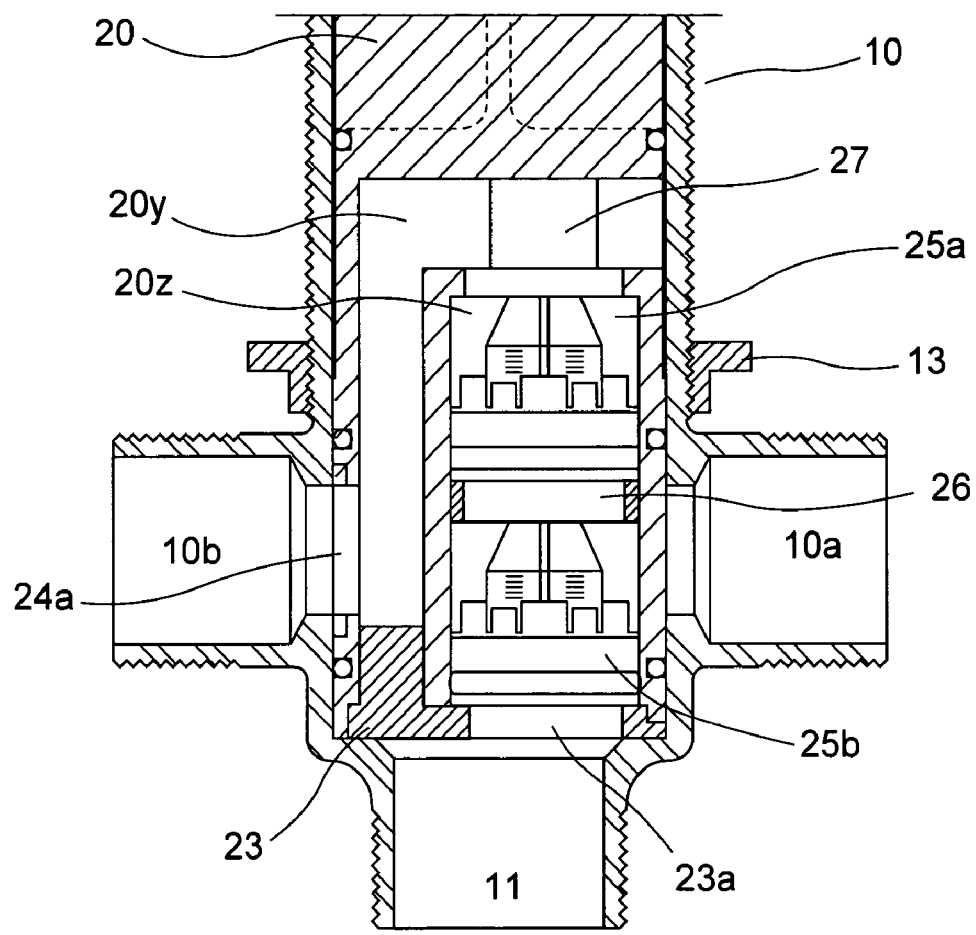
FIG. 6 is a close-up view of the bottom section of the valve shown in FIG. 4.
Figure 7:
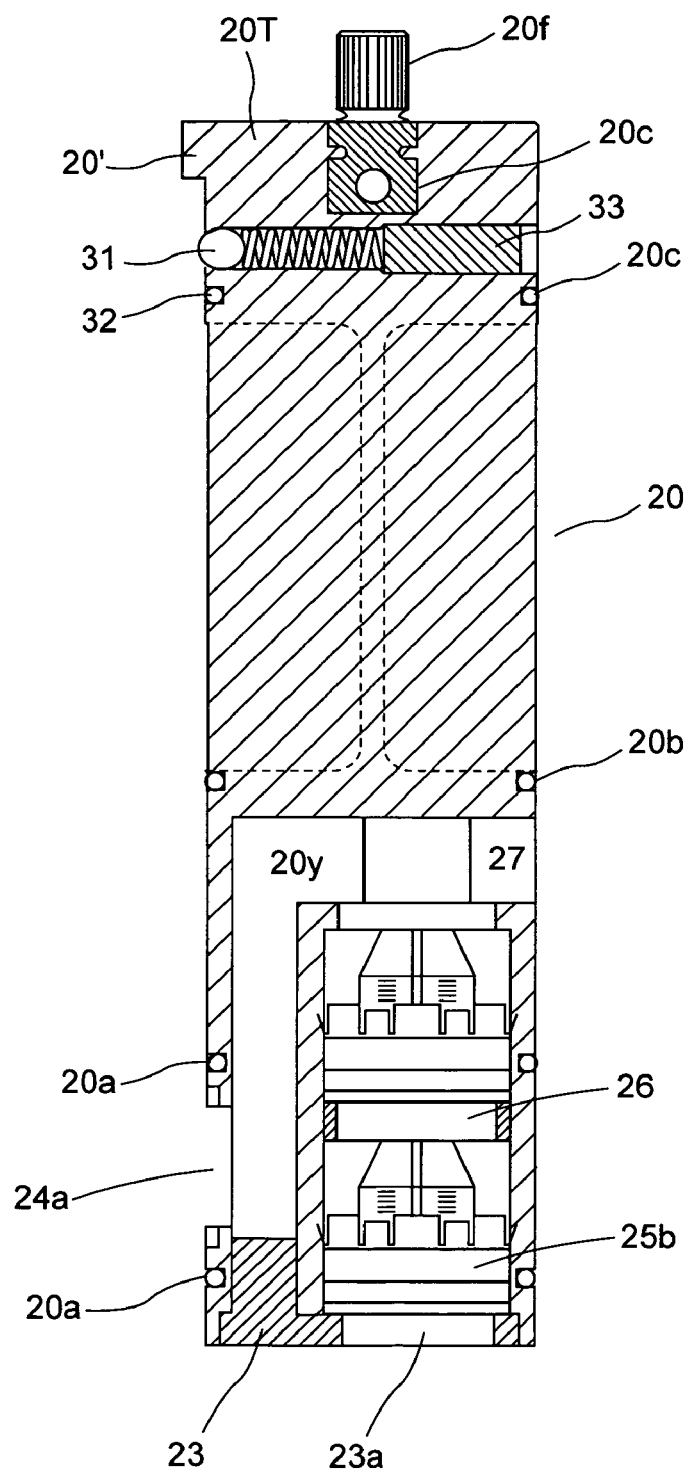
FIG. 7 is a cross-sectional schematic view of the cartridge of FIG. 4 illustrating the components thereof and shown in one embodiment of the invention.
Figure 11A:
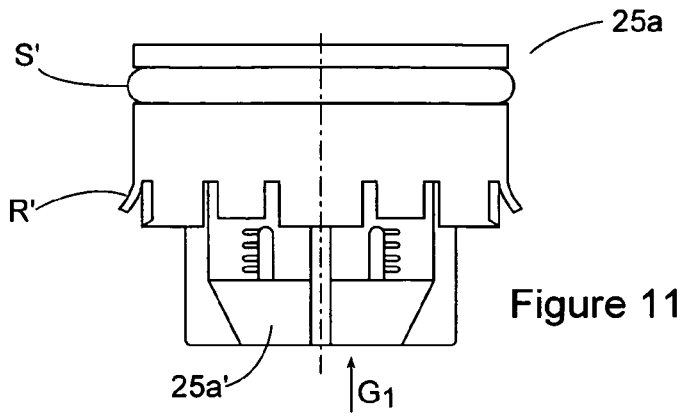
FIGS. 11A, 11B and 11C are side, cross-sectional and perspective views respectively of the check mechanism (25A) and (25B) as best seen in FIG. 4 and illustrated in one embodiment to the invention.
Figure 11B:
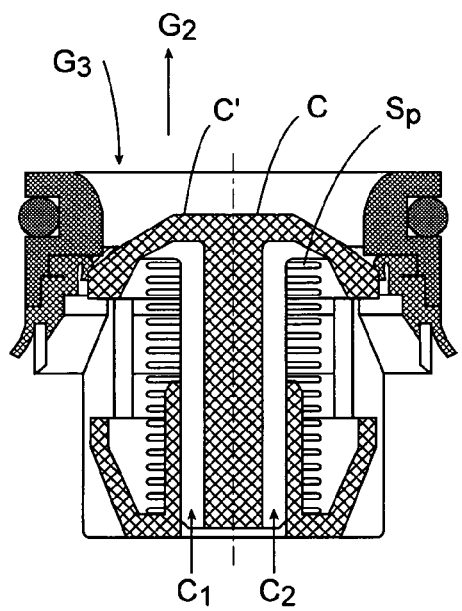
Figure 11C:
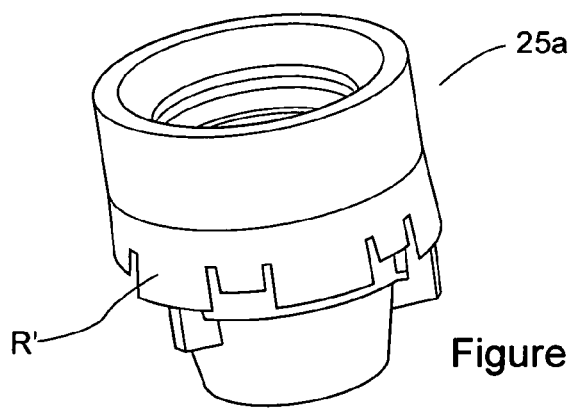

Referring to FIGS. 4, 4A, 5, 5A, 5B, 5C, 5D, 5E, 5F, 5G, 6 and 7 the details of the valve assembly may be more readily observed. The diverter stem (20) therefore includes proximate the bottom therefore a stem plug (23) which is used to define the opening (23A) providing the inlet to the diverter stem. The stem plug also prevents water from passing from the waterway (27 and 20Y) back to the inlet (11) of the valve body. The diverter stem (20) also includes proximate the stem plug a cylindrical wall (25') which defines a cylindrical opening within which check members (25 and 25B) are contained. Alternatively a check cartridge R may be provided as seen in FIG. 5B, in which case plug 23 is not required as the entire check cartridge accomplishes the same purpose. The check valves (25A and 25B) allow water to pass through the opening (23A) into the waterway (27 and 20Y) which carry water through to the respective outlet (10A, 10B and 10C) but does not allow water to pass from said waterway (27, 20Y) back through the check valves to potentially contaminate the water supply. The provision of two check valves (25A and 25B) is a matter of code requirements in a given circuit to ensure that the potable water supply is not contaminated by water returning from a outlet through to the inlet. The operation of the check mechanisms is best illustrated and described in relation to FIGS. 11A, 11B and 11C, the description of which will follow hereinafter.

Figure 13:
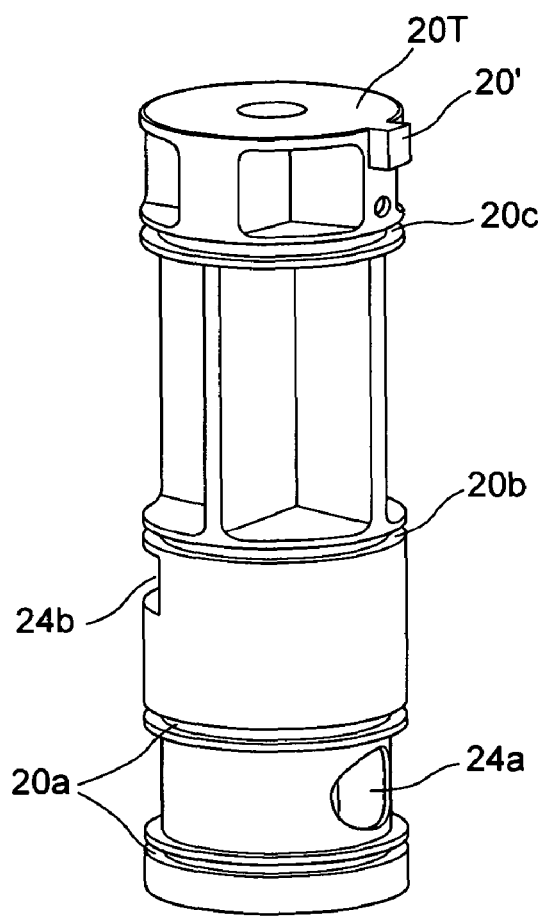
FIGS. 13 and 13A are views similar to that of FIG. 10 provided for comparison purposes of preferred embodiments.
Figure 13B:
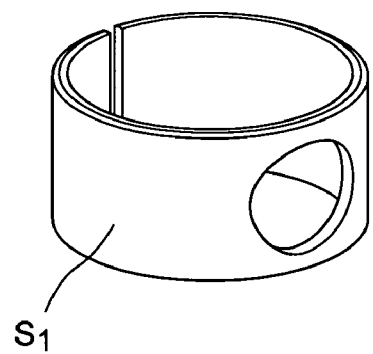
FIG. 13B illustrates the preferred cylindrical seal used in conjunction with the cartridge of FIG. 13A.
Figure 13A:
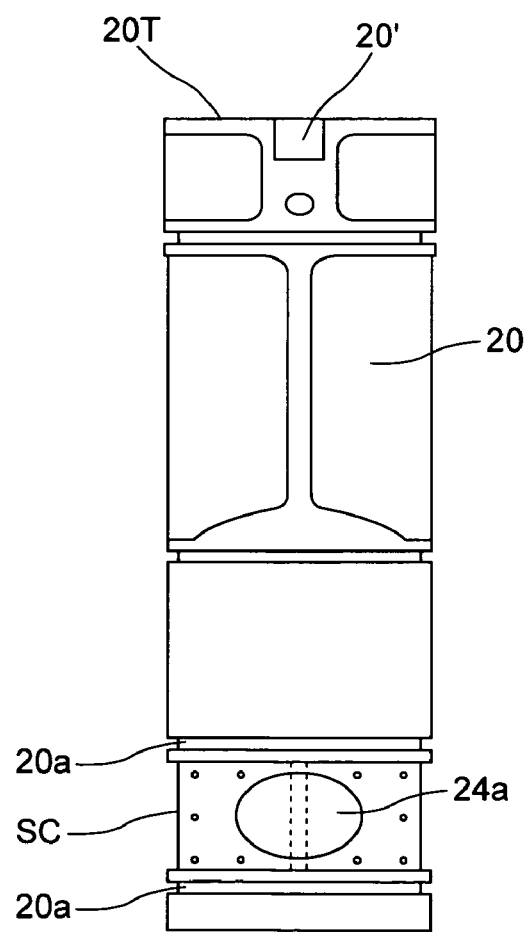

Referring to FIGS. 4 and 4A, the diverter stem (20) has disposed proximate the top thereof a sleeve portion (21) and handle engaging portion (22). The sleeve portion (21) also has an opening (22B) provided therewith to enable a pinion like portion (20F) dispose proximate the top of the diverter stem to access said sleeve (21). In this manner when the handle portion, not shown, is engaged with the handling engaging portion (22) and as the handle is rotated in a predetermined direction the stem cartridge (20) will rotate. The portion 20F includes a portion 20E which extends into the opening disposed on the top 20T of the diverter stem (20) as best seen in relation to FIG. 13. This anchoring portion 20E therefore extends into that opening. The nylon washer (15A) extends around that assembly to provide sealing thereof. The trim nut (9) will therefore be fastened over the sleeve (21) and the top 20T of the diverter stem (20) when said diverting stem (20) is inserted with an opening (10') of the body (10) for valve assembly (5). The stop mechanism 31 as best seen in FIGS. 3 and 5 is provided with the stem portion (20) which engages dimples (10") disposed above the perimeter of the interior of the opening (10') of the valve body (10) at the height illustrated in FIG. 3. The ball bearing (31) therefore is resiliently biased by the spring portion (31) and the plug portion (33) to enter the dimples through opening (31') so that at predetermined selected positions, the openings of the diverter stem will be in alignment with the openings of the valve body and providing thereat some positive resistance of further rotation of the diverter stem, thereby providing engagement and positioning of the diverter assembly. The diverter stem (20) also includes and carries the necessary grommets (20C, 20A and 20B) to ensure the integrity of the waterway, so that as best seen in FIGS. 13 and 13A, water passing around the valve and out the waterway to the outlet (24A), will be properly sealed from permitting water to pass through outlet (24B). In one embodiment a cylindrical seal S1 made from engineered plastic, such as Delrin™, is provided as best seen in FIG. 13B which is carried in cut out SC to ensure integrity of the water path.

Figure 8A:
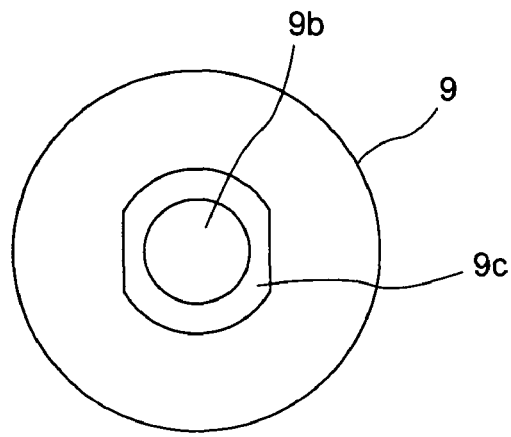
FIGS. 8A, 8B and 8C are a top view, side view in section and a perspective view respectively of the trim nut portion of the valve assembly.
Figure 8B:
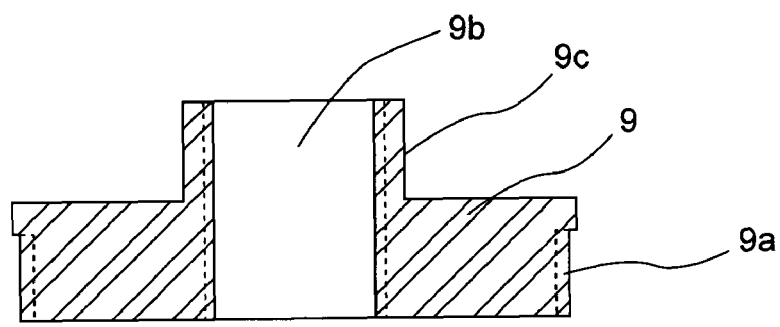
Figure 8C:
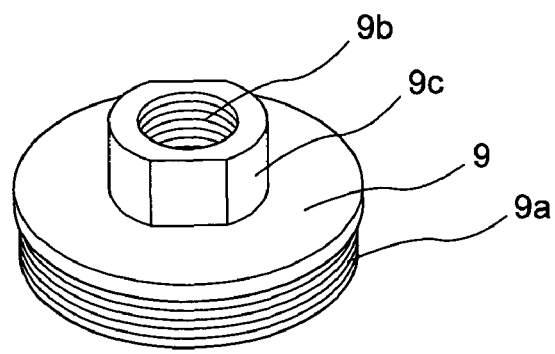

Referring now to FIGS. 8A, 8B and 8C there is illustrated trim nut (9) having a top and having extending from the top to the bottom of the trim nut (9) an opening or port (9B) defined within a nut portion (9C) which provides for the sealing of the top of valve body. The threaded portion (9A) of the trim nut (9) allows the sleeve (21) to pass there-through so that the handle engaging portion (22) in communication with the handle will access and operate the diverter stem (20).

Figure 9A:
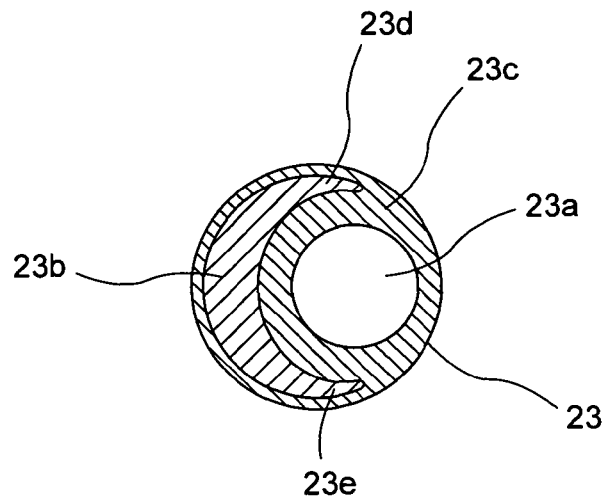
FIGS. 9A, 9B and 9C are a top view, a side view in section, and a perspective view respectively of the stem plug as best seen in FIG. 3.
Figure 9B:
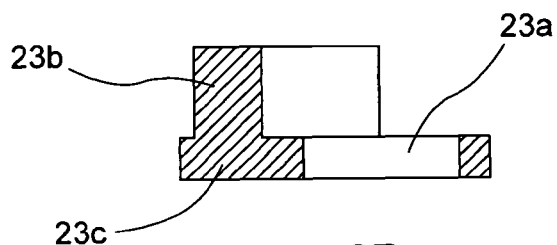
Figure 9C:
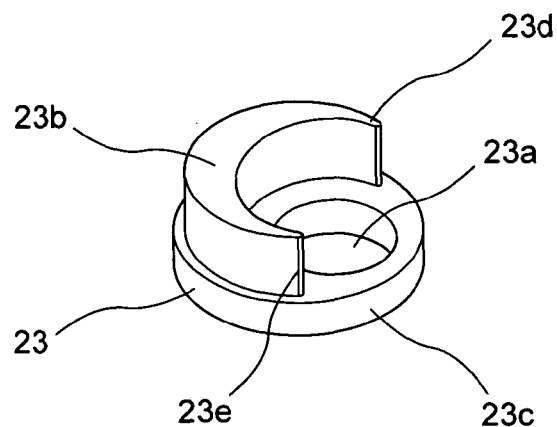

Referring to FIGS. 9A, 9B and 9C as previously described the stem plug (23) is illustrated in isolation from the diverter stem (20). The stem plug (23) therefore includes an opening (23A) to allow the passage of water into the diverter stem (20), and which provides a crescent shaped member (23B) as positioned in relation to FIG. 4 to circumscribe a portion of the cylindrical wall (20X) which retains the check mechanisms and which further provides a ring portion (23C) to close the bottom of the diverter cartridge (20) as best seen in relation to FIG. 4. The crescent shaped portion (23B) includes ends (23D and 23E) to partially surround the opening (23A) thereof. Alternatively as best seen in relation to FIGS. 5A to 5G, there is shown a check cartridge R which is replaceable separate from the diverting cartridge and including end 23' which serves the same purpose as stem plug 23 to separate the waterways. When check cartridge R is installed it operates in a similar manner to FIG. 3 with exception of there being less turbulence. The cartridge R includes a wall 20' extending about the check cartridge containing elements 25A and 25B. The top of the check cartridge R includes a wall portion 21' cut back from 20a' as shown, and including at the other end thereof a base 23' including a key 23a' designed to fit in the opening 20Z and to ensure waterway integrity as best seen in FIGS. 5E, 5F and 5G.

Referring to FIG. 10 the components thereof are clearly described and labelled in the prior drawings. However the opening (31') is clearly seen in this illustration through which the ball bearing (31) of the stop mechanism previously described will extend. The tang portions (20') extending from the top (20T) of the diverter stem (20) will be described hereinafter in relation to FIGS. 12 and 13.

Referring now to 11A, 11B and 11C there is illustrated the preferred check mechanism embodied with the preferred embodiments of this invention. This check mechanism is purchased from Neoperl, Inc of Waterbury Conn. and provides for the operation of the checking function as is known and described at their website at www.neoperl.com for Check Valve product OV20. The reader is referred to that company's website for further information in relation to this construction of this check valve assembly. Generally speaking the check valve (25A) is illustrated which permits water to flow in a direction permitting water to pass through the valve assembly into the waterway but prevents water from passing back through the check valve to the valve body inlet. Rib portions R' are provided about the circumference of the check (25A) which includes a skirt portion (25A') and the sealing part (S') to allow water to move in the direction shown in the illustration G1, G2 and G3 respectively. Spring portions ($S_P$) are also provided for the operation of the valve to prevent water or permit water to move in and out of the check in relation to channels C1 and C2 and the faces C and C' of the check members.

Figure 12A:
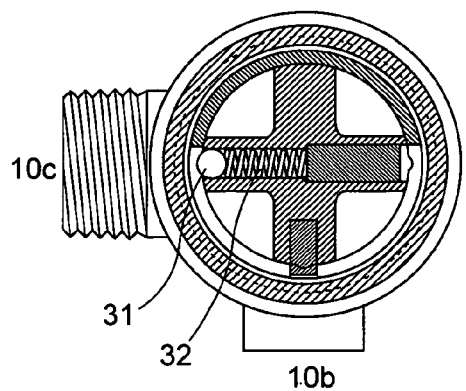
FIGS. 12, 12A, 12B, 12C, and 12D are top views of the diverter stem of FIGS. 7 and 5A illustrating the stops or the detents that permit the selective alignment of the outlets of the diverter stem with the body of the valve and illustrated in preferred embodiments of the invention.
Figure 12B:
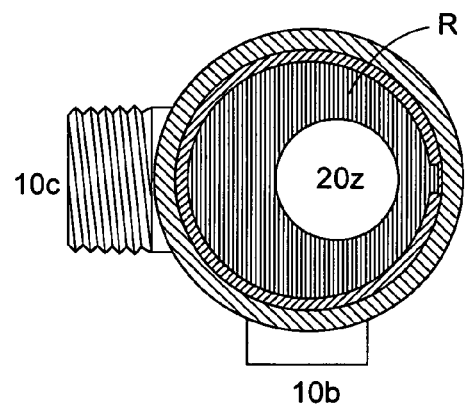
Figure 12C:
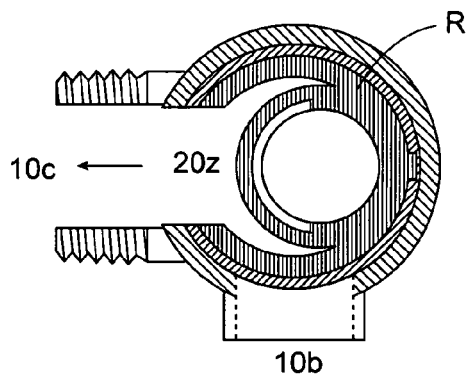
Figure 12D:
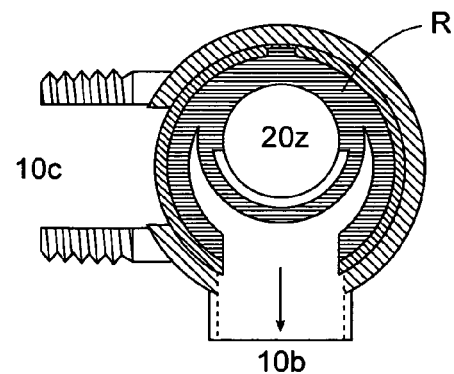
Figure 12:
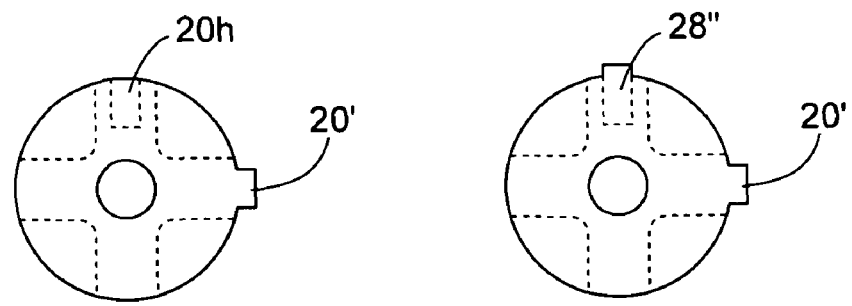
Figure 14A:
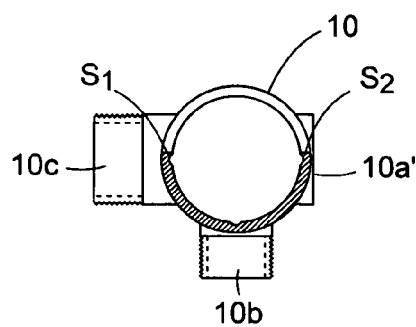
FIGS. 14A, 14B and 14C are top, side and perspective views respectively and illustrated in an alternative embodiment of the body (10) of the diverting valve assembly (5).
Figure 14B:
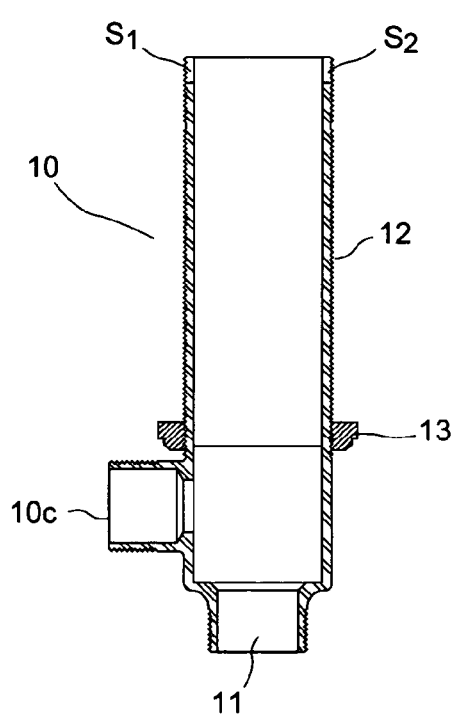
Figure 14C:
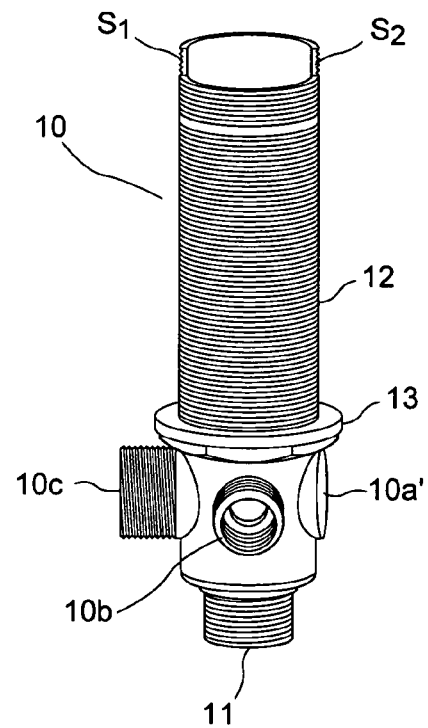
Figure 15A:
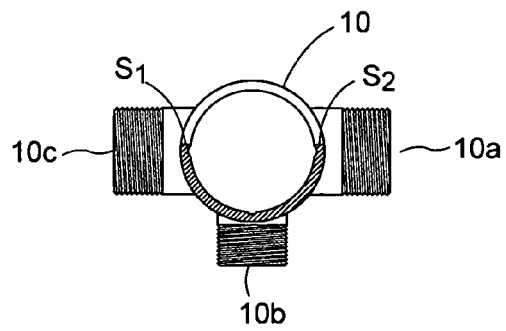
FIGS. 15A, 15B and 15C are top, side and perspective views respectively of the valve body of FIG. 2.
Figure 15B:
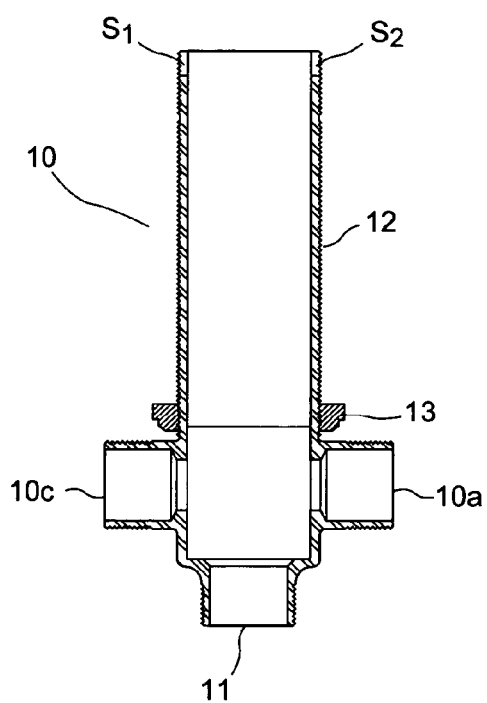
Figure 15C:
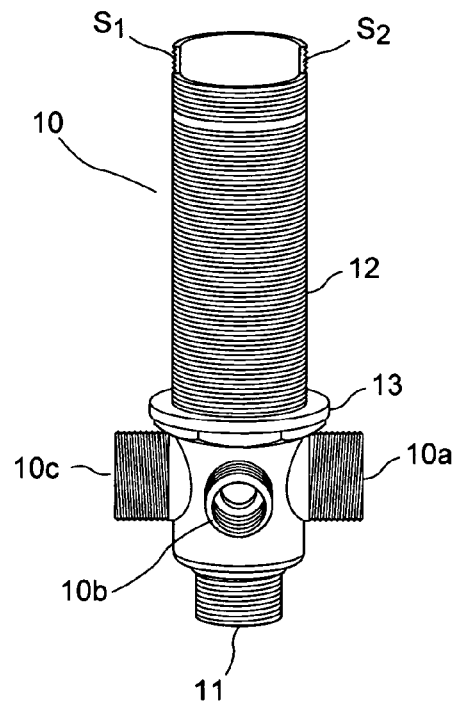

Referring to FIGS. 12, 12A to D, and 13 there is illustrated the top portion (20T) of the diverter stem (20) which includes detents (20') and (28") as best seen in FIG. 12. The detent (28") constitutes a pin which may be inserted with an opening (20H) as shown to provide for a stop portion to permit the valve to move and yet stop at predetermined positions as desired in relation to the body parts shown in FIGS. 14A, 14B, 14C and 15A, 15B and 15C, the operation of which is very similar with the exception of the inclusion of the pin portion (20') to permit the diverter stem (20) to stop at predetermined locations via the portions (S1 and S2) as best seen in relation to this set of FIGS. 14A, 14B, 14C and 15A, 15B and 15C to ensure the correct alignment of outlets (20A, 20B,) with the outlets 10A, 10B and 10C respectively. It is noted that with the installation of the body (10) of FIGS. 14A, 14B and 14C that outlet (10A) is removed and a plug (10A') is inserted therein for obvious reasons. When a check cartridge is employed as seen in FIGS. 12A-12D the operation is quite similar to other embodiments to allow water to flow through the cartridge R into space 20Z and out the appropriate outlet.

Referring to FIGS. 16A and 16B there is illustrated a flush plug (40) having a top and including a handle portion (41) and a stop portion (42A and 42B) which will engage the stop portions (S1 and S2) of the valve body (10). The plug also includes sealing portions (40A) proximate the vertical wall thereof so that when the flush plug (40) is inserted within the opening (10') of the valve body, as best seen in FIG. 16C, that the integrity of the water path may be checked for leaks prior to installation of the diverter stem (20).

The deck mounted diverter valve (5) can therefore be used primarily for roman tubs and includes a double check valve to ensure that the code is met while still providing a simple easy to use valve assembly.

A reliable simple diverting valve therefore is provided which meets the objectives of the invention as set out above and overcomes the limitations in the prior art.

As many changes can be made to the embodiments of the invention without departing from the scope of the invention; it is intended that all matter contained herein be interpreted as illustrative of the invention and not in a limiting sense.

The embodiments of the invention in which an exclusive property or privilege is claimed are as follows:

1. A diverting valve assembly comprising a body containing an opening therein, said opening for receiving a stem cartridge, said body comprising a bottom inlet and at least one laterally directed outlet, said stem cartridge comprising a bottom inlet and at least one laterally directed outlet having a waterway disposed there between, said stem cartridge being operable to selectively permit mixed hot and cold water to flow to said outlet of said body from an outlet of said cartridge, the bottom inlet of said stem cartridge, including the waterway, having a separate replaceable check cartridge including two check valve assemblies in series in the replaceable check cartridge thereby allowing for water to flow from the inlet toward at least one outlet of the stem cartridge but which does not permit the water to return from the waterway through the check cartridge into the waterway to the inlet, said check cartridge have disposed at one end thereof a base to maintain separation of the waterway of the stem cartridge, said base including a keyed portion designed to fit within the stem cartridge to ensure that the waterway properly align for operation of said diverting valve assembly, wherein water from the outlets cannot re-enter the water supply to the valve to contaminate said water supply, and wherein the check cartridge may be replaced without the necessity of replacing the stem cartridge.

2. The diverter valve of claim 1 wherein said body includes a cut out portion proximate the top thereof extending about a predetermined extent of the body for co-operation with a stop portion provided with the cartridge to limit the rotation of the cartridge between the selected positions.

3. The diverter valve of claim 1 wherein said body includes a threaded portion proximate the top thereof adjacent the opening thereof for receiving a corresponding threaded rotatable plug for retaining the cartridge in place within said body.

4. The valve of claim 1 further comprising a threaded rotatable plug with an opening to receive a spindle portion surrounded by a cylindrical sleeve threaded on the exterior thereof to allow attachment of appropriate trim portions adjacent a handle.

5. The valve of claim 1 wherein said body includes a detent and said cartridge includes a mating tab to ensure correct alignment of all functions of said valve.

6. A diverting stem cartridge for a diverting valve assembly, said diverting stem cartridge comprising a check cartridge which is replaceable separately from the diverting stem cartridge when necessary, said check cartridge have disposed at one end thereof a base to maintain separation of the waterway of the diverting stem cartridge, said base including a keyed portion designed to fit within the diverting stem cartridge to ensure that the waterway properly align for operation of said diverting valve assembly, said check cartridge also including a wall extending from said base and for containing the checking elements of said check cartridge.

7. The diverting stem cartridge of claim 6 wherein said wall of said check cartridge is cut back adjacent the top thereof.

* * * * *